Aug. 6, 1935. J. C. MacLACHLAN ET AL 2,010,101
METHOD AND APPARATUS FOR DRYING LIQUID AND SEMILIQUID MATERIALS
Filed March 28, 1932 3 Sheets-Sheet 1
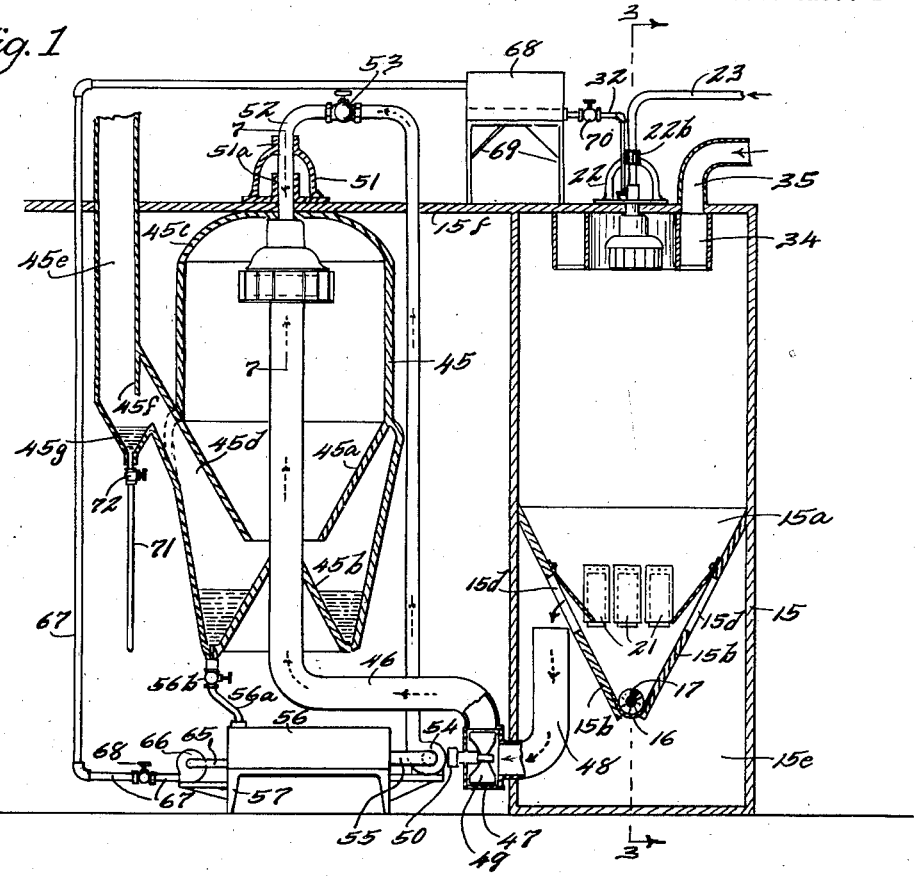
Fig. 1
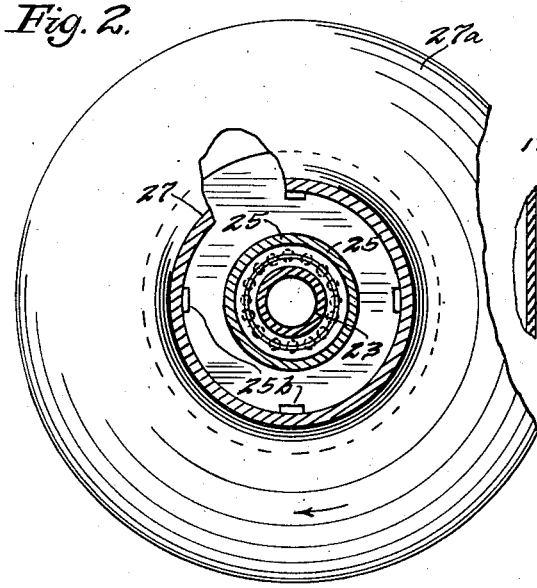
Fig. 2.
Fig. 11.
INVENTORS
JOHN C. MACLACHLAN
JOHN M. MACLACHLAN
BY
ATTORNEY Aug. 6, 1935.   J. C. MacLACHLAN ET AL   2,010,101
METHOD AND APPARATUS FOR DRYING LIQUID AND SEMILIQUID MATERIALS
Filed March 28, 1932   3 Sheets-Sheet 2

INVENTORS
JOHN C. MACLACHLAN
JOHN M. MACLACHLAN
BY
ATTORNEY

Patented Aug. 6, 1935

2,010,101

UNITED STATES PATENT OFFICE 2,010,101

METHOD AND APPARATUS FOR DRYING LIQUID AND SEMI-LIQUID MATERIALS

John C. MacLachlan and John M. MacLachlan, Chicago, Ill., assignors of one-third to Albert P. Hunt, Chicago, Ill.

Application March 28, 1932, Serial No. 601,584

16 Claims. (Cl. 159—4)

This invention relates to a method and apparatus for drying liquid or semi-liquid material. While the invention is applicable to various substances of a liquid or semi-liquid nature, one material which it is designed to dry, is milk. In the particular type of drying apparatus illustrated, the liquid is sprayed centrifugally in a large chamber commonly called a drying cabinet. Various means have been proposed and used for spraying the milk centrifugally at the upper portion of the cabinet. Such means usually comprise rotating members of various types having means for receiving and disintegrating the liquid and projecting the same in a shower in finely divided condition. These rotating spraying heads have generally been driven by an electric motor, by belts or by steam turbines connected thereto. The milk has usually been projected outwardly in an umbrella-like shower in the cabinet and heated air passed through the cabinet and the sprayed milk or other liquid in various ways. Applicants have conceived the idea of driving or rotating the spraying apparatus by means of air, which air is also used to disintegrate and project the milk or other liquid.

It is an object of this invention therefore, to provide a method and apparatus for drying liquid or semi-liquid materials in which the material is delivered to a rotating head which disintegrates and projects the liquid in finely divided form, said head being rotated by air delivered thereto, which air also assists in disintegrating and projecting said liquid.

It is a further object of the invention to provide an apparatus comprising a rotating member having means for receiving the liquid to be dried, disintegrating said liquid and projecting the same, which member is constructed and arranged to be rotated by air, together with means for supplying air under pressure to said member for rotating the same, and means for supplying liquid to said member, which liquid is disintegrated and projected in finely divided condition by the joint action of said member and said air.

It is a further object of the invention to provide such a distributing head as set forth in the above paragraph, the same being disposed adjacent the top of the drying cabinet, together with means for delivering a whirling current of air about said head in said cabinet which whirl rotates in the same direction as said head.

It is also an object of this invention to provide a simple and efficient form of collector cooperating with a drying cabinet for conducting the air therefrom, which air is used to drive a spray head to which fresh milk or liquid is delivered to be condensed.

It is a further object of the invention to provide such a collecting device of the wet collector type, having a means for delivering liquid thereto, a member rotatable about said means and comprising circumferentially spaced blades to which said liquid is delivered, and means for discharging air into a drying cabinet against said blades to rotate said member and project said liquid therefrom, whereby any milk or other powder carried by said air will be engaged by said liquid and removed from said air.

It is still another object of the invention to provide a drying plant comprising a drying cabinet, an air operated spraying device in said cabinet, means for supplying additional air to said cabinet, a wet collector comprising a cabinet, a rotating means therein for distributing liquid in said cabinet, said rotating means being operated by the air withdrawn from said drying cabinet, whereby said liquid is partially evaporated and any powder in said air is removed by said liquid.

These and other objects and advantages of the invention will be fully set forth in the following description made in connection with the accompanying drawings, in which like reference characters refer to similar parts throughout the several views, and in which:—

Fig. 1 is a view in vertical section of the drying plant, embodying the present invention; taken on line 1—1 of Fig. 3;

Fig. 2 is a horizontal section taken on line 2—2 of Fig. 9, as indicated by the arrows;

Fig. 11 is a vertical section taken on line 11—11 of Fig. 5.

Figure 5:
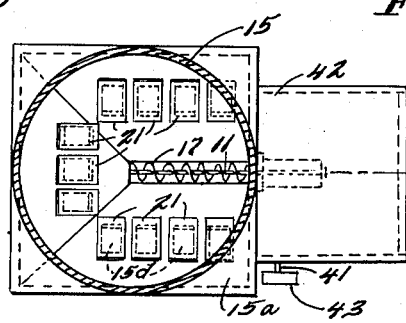
Fig. 5 is a horizontal section taken on line 5—5 of Fig. 3; as indicated by the arrows.
Figure 3:
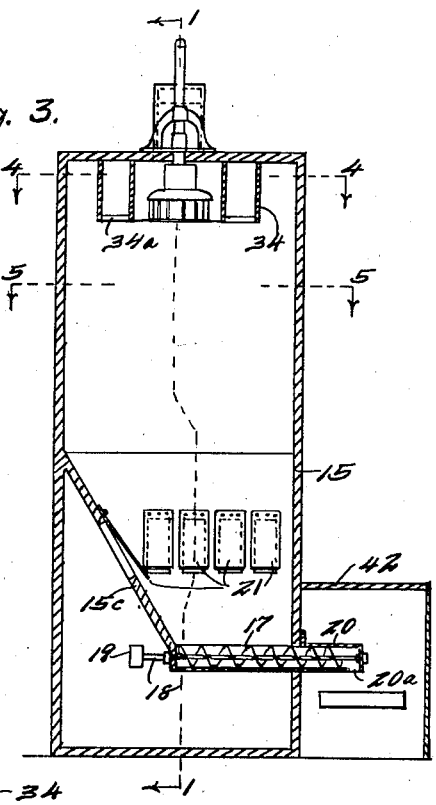
Fig. 3 is a vertical section on line 3—3 of Fig. 1, as indicated by the arrows.
Figure 4:
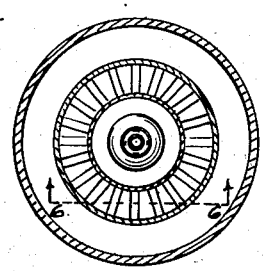
Fig. 4 is a horizontal section on line 4—4 of Fig. 3, as indicated by the arrows.
Figure 6:
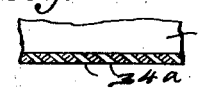
Fig. 6 is a vertical section taken on line 6—6 of Fig. 4, as indicated by the arrows.
Figure 7:
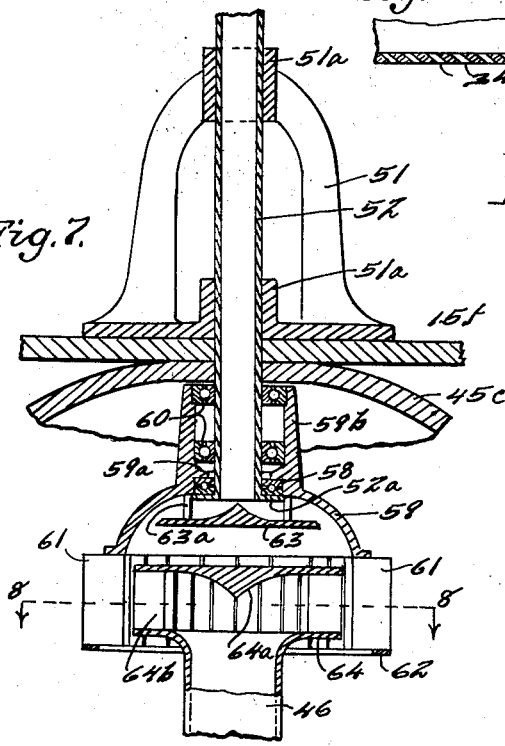
Fig. 7 is a central section taken on line 7—7 of Fig. 1.

Referring to the drawings, particularly Figs. 1 to 3, a plant for drying liquid or semi-liquid material is shown, comprising a cabinet 15. Such a cabinet is quite large, usually ten or twelve feet in diameter and about thirty feet high. While the cabinet may be made of various shapes, in the embodiment of the invention illustrated the top part of the cabinet is shown as cylindrical and the lower portion 15a is shown as having a vertical wall and three downwardly converging walls as shown in Figs. 1 and 3.

Figure 10:
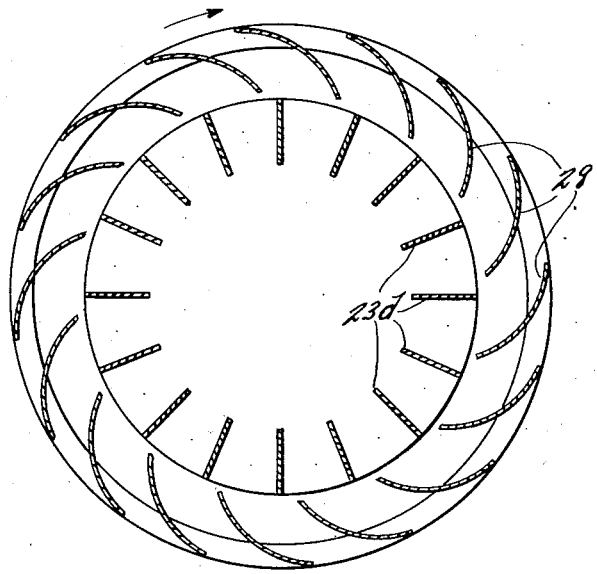
Fig. 10 is a horizontal section taken on line 10—10 of Fig. 9, as indicated by the arrows.
Figure 9:
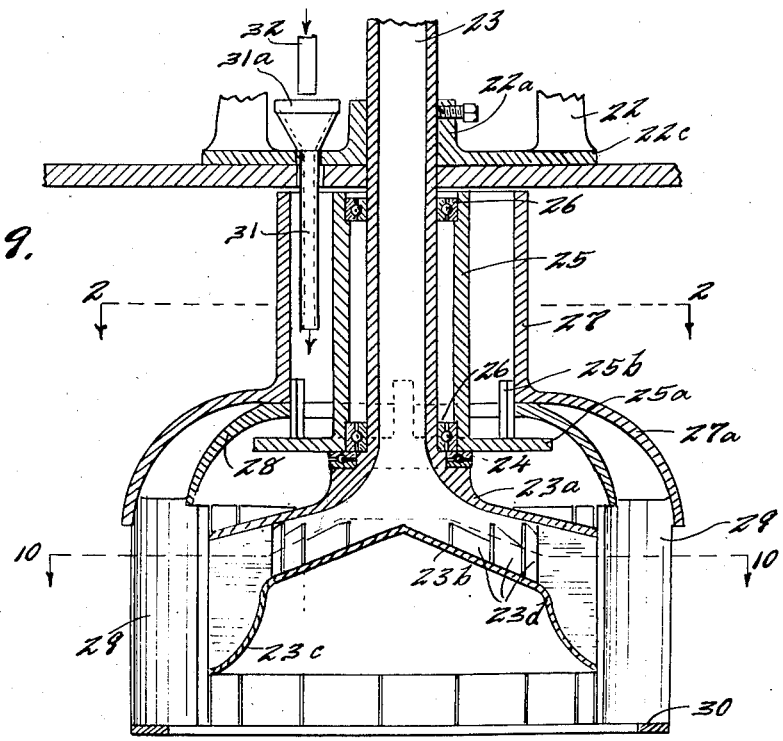
Fig. 9 is a central vertical section through the distributing head of the drying cabinet.

The oppositely disposed converging walls 15b form a trough at their bottom preferably having a metal bottom 16 in which is disposed a screw conveyor 17. The other inclined wall 15c extends downward to one end of trough 16. Conveyor 17 has a shaft 18 secured thereto and extending centrally thereof and said shaft projects beyond the end of trough 16 and has secured thereto a pulley 19 adapted to receive a suitable belt for driving said conveyor. Trough 16 is extended outwardly of the conveyor in the form of a chute 20 into which the conveyor 17 also extends, said chute 20 having a downwardly directed opening 20a at its outer end. Conveyor 17 extends through a substantially circular opening in the vertical wall of cabinet 15. The walls 15b and 15c have openings 15d therethrough shown as of rectangular form and plates 21 are secured to said walls along the tops of said openings, said plates extending at an angle to said walls so that their lower ends are disposed some distance from said walls and openings. A spraying apparatus is disposed centrally of the cabinet 15 adjacent the top thereof shown somewhat in detail in Figs. 9 and 10. A bracket 22 is mounted on the top of cabinet 15 and rigidly secured to said top. Said bracket has a lower hub 22a and an upper hub 22b, which hubs are connected to the base flange 22c of said bracket by suitable circumferentially spaced arms. A pipe 23 is rigidly carried in the bracket 22 and extends downward through the top of cabinet 15, the same being secured to and communicating with a hollow head 23a at its lower end. Head 23a is of annular form, having a conical bottom 23b and having an enlarged peripheral portion 23c. A plurality of partions 23d extend vertically between the top and bottom of member 23a and divide the passage therethrough into radially extending passages, said partitions extending to the outer edge or periphery of member 23a. While the openings between the partitions 23d are shown as quite large, it will be understood that these may be made of any desired size. The member 23a has a step formed thereon on which is seated a ball bearing cage 24, the same acting to support a revoluble sleeve 25. Ball bearings 26 are also disposed between pipe 23 and the sleeve 25 so that sleeve 25 can rotate freely about pipe 23 and will be supported by the bearings 24. Sleeve 25 has a horizontal flange 25a extending outwardly therefrom at its lower end, from which extend upwardly arms 25b which are secured by welding or otherwise to the inner side of a cylindrical sleeve 27. It will be seen that sleeves 25 and 27 are spaced to form an annular passage therebetween, or said members constitute in effect an annular sleeve. The sleeve 27 at its lower end has an outwardly and downwardly curved flange 27a. A disk 28 is secured to the bottom of sleeve 27 and to the arms 25b and also extend outwardly and downwardly within the flange 27a. Disk 28 has an opening therethrough alining with the opening in sleeve 27 and of the same diameter. Disk 28 extends to the upper and inner side of a plurality of blades or plates 29, to the upper inner portions of which it is rigidly connected as by welding or otherwise. The outer upper portions of the blades 29 are secured to the flange 27a which connection can also be made by welding. The blades 29 are circumferentially spaced and arranged in an annulus as shown in Fig. 10 and extend inwardly quite close to the periphery of member 23a. It will be noticed that blades 29 are somewhat curved to have concave surfaces at their inner sides and extend at an angle to the radius of said annulus or of members 27 and 28. In addition to being secured at their upper ends to members 27 and 28, said blades are connected at their bottoms by a ring 30 to which they may be welded. A pipe 31 extends through bracket 22 and an opening in the top of the cabinet into the annular space between sleeves 25 and 27, said pipe having a funnel 31a at its top into which the liquid to be dried is delivered through a suitable pipe 32. An annular casing 34 is provided in the top of cabinet 15 surrounding the distributing head and having its bottom substantially flush with the member 30. Said bottom is provided with openings 34a which will be formed between slats or portions 34b so as to extend at an angle. Air is supplied to casing 34 through an air supply conduit 35. With this construction it will be seen that the air passing out of casing 34 will be directed downwardly with a whirling motion in the cabinet 15.

The milk discharged from chute 20 by the conveyor 17 falls upon a screen 36 which will be oscillatably mounted in any suitable manner, as by being suspended by the swinging links 37. Screen 36 will be oscillated or vibrated by any suitable means, as by a link 38 pivotally connected to a lug 39 on the bottom of said screen, which link has at its other end an eccentric strap 38a surrounding an eccentric 40 carried on a shaft 41. The screen 36 and chute 20 are disposed in an auxiliary cabinet 42 at one side of the cabinet 15. Shaft 41 extends to the outside of cabinet 42 and has secured thereto a pulley 43 adapted to receive a belt for driving said shaft and oscillating screen 36. Screen 36 has a bottom or chute portion 36a below the screen proper 36b therein and chute 36a will direct the screened material to a suitable receptacle such as a barrel 44. Practically all of the powder passes through the screen 36b and this screen is provided for the purpose of distributing and cooling the powder before it is placed in the receptacle 44.

The cabinet 15 has a chamber 15e at its bottom beneath the walls 15b and 15c and the air delivered to cabinet 15 passes through openings 15d into this chamber 15e. There will be some powder drawn through the openings 15d with the air as it rushes therethrough and some of this will precipitate on the floor of the chamber 15e.

Figure 8:
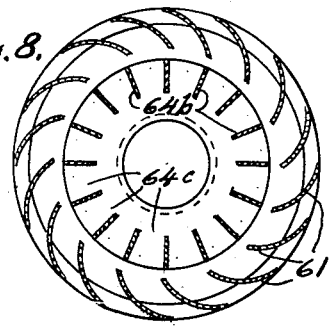
Fig. 8 is a horizontal section taken on line 8—8 of Fig. 7, as indicated by the arrows.

It is desired to recover the powder passing out with the air and as the air leaves the drying cabinet, at quite a high temperature, it is desired to use this heated air to condense or partially condense the liquid which is to be delivered to the drying cabinet. For this purpose the drying plant illustrated comprises a collector and this collector is of the type known as a wet collector. This collector comprises a cabinet 45 having a main cylindrical portion, a lower conical delivery portion 45a and an annular portion 45b of V-shape in radial cross section into which the portion 45a delivers. Portion 45b has an opening centrally through its bottom and a conduit 46 extends through this opening, said conduit communicating with the discharge portion of the fan casing 47, the inlet of which is connected to the conduit 48 extending into chamber 45e, the top of said conduit being substantially of the height of the lower portions of the openings 15d. A fan 49 is mounted in casing 47 having a shaft extending from said casing to which a pulley 50 is secured, by means of which the fan will be driven. The main cylindrical portion of cabinet 45 is illustrated as having a semi-cylindrical top portion 45c and the top 15f of the cabinet 15 extends thereacross, which may constitute one floor of a building. A bracket 51 is mounted on top 15f, which bracket has spaced hub portions 51a in which is secured a pipe 52. Pipe 52 is shown as being equipped with a valve 53 at its upper end and this pipe extends downwardly at the side of cabinet 45 and is connected to the discharge side of a pump 54, the inlet conduit 55 of which pump leads from a storage tank 56 mounted upon a suitable frame 57. Pump 54 is shown as mounted on a shelf extending from frame 57. A pipe 56a connects the top of tank 56 with the bottom of portion 45b of the cabinet 45, said pipe being equipped with a valve 56b. Pipe 52 extends downwardly through the top 45c and is provided with a flange 52a at its lower end on which a step ball bearing 58 is supported, and this bearing in turn supports an inwardly extending flange 59a of a rotating member 59. Member 59 has an upwardly extending sleeve 59b surrounding the pipe 52, ball bearings 60 being inserted between said sleeve and pipe on which member 59 revolves. Below sleeve 59b member 59 is in the form of a substantially semi-spherical disk having a concave under surface which extends to the upper inner side of a plurality of circumferentially arranged blades 61, said blades being secured to the flange at the lower edge of said concave disk by welding or other suitable means. Blades 61 are curved as shown in Fig. 8, having their concave sides inwardly and extending at an angle to the radius of the annulus in which they are disposed. Blades or plates 61 are connected at their lower ends by a ring 62 to which they are connected by welding or otherwise. A disk 63 having a substantially conical upper surface is disposed centrally below pipe 52 and is connected to said pipe by a plurality of arms 63a extending upwardly therefrom and connected to the inner side of said pipe.

Conduit 46 extends upwardly centrally of the member 59 and has at its upper end a head 64 having a plate-like top portion 64a, the center of which is of inverted conical shape. Member 64 has an annular periphery and partitions 64b extend between its top and bottom, the outer ends of said partitions being flush with the periphery of said member and said partitions extending inwardly some distance from said periphery in radial planes. It will be seen that the air passing upwardly through conduit 46 will be discharged outwardly through the passages 64c formed between the partitions 64b. These passages 64c can be made of various sizes and may, if preferred, be much narrower so as to be substantially in the form of nozzles. A pipe 65 leads from the bottom of tank 56 opposite the end, to which pipe 55 is connected, and this pipe 65 connects with the inlet side of a rotary pump 66. A pipe 67 connects to the outlet side of pump 66, the same being shown as equipped with a valve 68. Pipe 67 extends upward through the portion 15f and delivers to a tank 68 supported upon a suitable frame-work 69 resting upon the portion or floor 15f. The pipe 32 leads from the bottom of tank 68 and is shown as equipped with a valve 70. A passage 45d leads upward from casing 45 from the portion 45b at one side of portion 45a and communicates with an upwardly extending conduit 45e which may deliver to the atmosphere. A baffle plate 45f extends vertically in line with one side of the conduit 45e at the junction thereof with passage 45d and a conical trap portion 45g is disposed beneath the conduit 45e at one side of passage 45d. A drain pipe 71 extends from the bottom of trap 45g, which pipe is shown as equipped with control valves 72.

In operation compressed air will be supplied to the pipe 23. While this air may be supplied at various pressures, a pressure of 25 pounds is quite suitable. Air is also supplied from a blower fan through the conduit 35. Both the air supplied through pipe 23 and that supplied through conduit 35 is preliminarily heated. This is done in furnaces especially provided for the purpose and the air is heated to substantially 300 degrees F. The air passing downwardly from member 23a passes out between partitions 23d and strikes the blades 29. Owing to the position of these blades, the impact of the air thereon causes member 27 to rotate. The air pressure will be sufficient to rotate member 27 at a speed between 3000 and 5000 revolutions per minute. The material to be dried, such as milk, is supplied from tank 68 and passes through pipe 32 into the funnel 31a and downward into pipe 31. This liquid drops onto the plate or disk 25a and is thrown out to the conical surface of the disk 28. As disk 25a extends close to the surface of disk 28, the milk is delivered to the latter with substantially no impact. The milk travels outwardly along the surface of disk 28 and is delivered from the lower edge thereof downwardly to the blades 29. The high speed of rotation of member 29 causes the milk to be distributed in a thin film on both sides of said blades and the milk is projected outwardly from the blades in very finely divided condition. This disintegration of the milk and the projection thereof is also carried out by the air being discharged from member 23a. The disintegration of the milk or other liquid is therefore caused both by the rotation of blades 29 and by the discharge of air from member 23a. By the joint action of these the milk is as stated, divided into very fine particles and this disintegration or division is carried out without any impact on the milk. The milk is thus projected in a shower outwardly from the blades 29 substantially in the form of mist. This shower of milk passing outwardly strikes the rotating current of air directed downwardly in the cabinet from the casing 34. This rotating current of air acts as a sort of cushion for the projected milk and the current of air delivered from the chamber 34 is rotating in the same direction as the blades 29. The finely divided milk particles travel downwardly in the cabinet with the rotating current of air and are practically instantaneously dried and drop to the bottom of the cabinet onto the walls 15b and 15c and this dried powder falls into trough 16 and is discharged by the conveyor 17. The material substantially fills the chute 20 so that practically no air passes out through the chute. The air discharged into the cabinet passes out rapidly through the openings 15d. There is always some fine dried powder carried along with the air and some of this powder will be precipitated in the chamber 15e and will collect on the floor thereof. The air then is drawn out of the chamber 15e through the conduit 48. The air passing into conduit 48 has had its temperature lowered to between 190 degrees and 200 degrees F. The air passes upwardly through conduit 46 and is delivered outwardly through the head 64 through the spaces 64c. This air strikes the blades 61 and owing to the disposition of these blades, they are caused to rotate so that member 59 rotates at high speed about the pipe 52, on the bearings 58 and 60. Member 59 rotates at approximately 500 R. P. M. The milk or other liquid is delivered from tank 56 by the pump 54 through the pipe 52 and passes downwardly onto the disk 63 from which it is thrown outwardly against the member 59 and is delivered to the blade 61. The milk is thrown outwardly by blades 61 which rotate at much lesser speed than the blades 29 and the milk is directed outwardly against the walls of cabinet 45 in finely divided liquid form. Any powder which is carried along by the air delivered through conduit 46 will be engaged by this liquid and carried therewith downwardly in the cabinet 45. The action of the air on the liquid, which air is still at comparatively high temperature, will evaporate a large proportion of the water therefrom so that the liquid will be considerably condensed. The liquid passes down through the conical portion 45*a* into the annular portion 45*b*. The air passes upwardly through passage 45*d* and out through the conduit 45*e*. Some moisture carried by the air will condense and will be intercepted by the baffle 43*f* and deposited in the trap 45*g*. This will be conducted to a suitable drain by the pipe 71. The milk is collected in tank 56 until it becomes of desired consistency, and it is then pumped out through the pipes 65 and 67 by pump 66 and delivered to the tank 68 from which it will be delivered to the drying cabinet. It will be seen that the liquid is delivered to member 59 and the blades 61 without impact, so that it will be thrown out in a shower of spray. The absence of impact prevents any foaming of the milk and this objectionable foaming which has been troublesome in some wet collectors, is eliminated. The air is reduced to a low temperature in the cabinet 45 and practically all of the heat has been withdrawn therefrom so that it passes out through conduit 45*e* heavily laden with moisture.

In starting the test run, the milk will be delivered first to the wet collector from tank 56 through the pipe 52 and the air will merely be passed through the drying cabinet without delivering material to the drying cabinet. After the milk has reached the desired consistency, the same will be turned into the drying cabinet and the plant can then be operated continuously.

The milk delivered from the chute 20 into the casing or pump 42 drops upon the reciprocating sieve member 36 and is distributed over the sieve proper 36*b* so that it is thoroughly aerated and cooled before being delivered to the receptacles 44.

From the above description it is seen that applicants have provided a highly efficient method and apparatus for drying liquid and semi-liquid material. It is very desirable that the division or disintegration of the material in the drying cabinet be accomplished without impact. If the material is struck violently by moving blades or members, the fat globules are broken and the dried product will not go as readily into solution as if the fat globules were not broken. The tendency of the dried product to become rancid, particularly a whole milk product, if the fat globules are broken, is also much greater. In the present method and apparatus the material is disintegrated by the joint action of the rotating blades and air, and the milk is divided with substantially no impact whatever. The driving of the distributor by heated air, which air acts in dividing, drying and projecting the material, is believed to be broadly new. The dried power carried from the drying cabinet is completely recovered by the sprayer in the wet collector and the heat of the air is effectively used in evaporating the liquid in the wet collector. A very efficient use is thus made of the heated air supplied to the drying cabinet. It will be apparent that the method and apparatus have a high degree of utility for the purpose intended.

It will, of course, be understood that various changes may be made in the form, details, arrangement and proportions of the apparatus and in the steps and sequence of steps of the method, without departing from the scope of applicants' invention, which, generally stated, consists in a method and apparatus capable of carrying out the objects above set forth, such as disclosed and defined in the appended claims.

What is claimed is:—

1. A distributing head for a drying apparatus having in combination, a rotating member having a series of circumferentially spaced blades for receiving and finely dividing liquid or semi-liquid material and projecting the same in finely divided condition, the inner ends of said blades having spaces therebetween both in radial and circumferential directions and means for directing air through said spaces against said blades for propelling said member to rotate said member, said air also acting on said material to disintegrate, project and assist in drying the same.

2. A distributing head for a drying apparatus having in combination, a rotatable member comprising a series of circumferentially spaced and annularly arranged blades, means for delivering liquid or semi-liquid material to said blades, and means disposed at the inner ends of said blades for directing air thereagainst to rotate said member and to disintegrate and project said material.

3. A distributing head for a drying apparatus having in combination, a vertical conduit for conveying compressed air, a member having circumferentially disposed air discharge openings to which said conduit is connected, a rotating member disposed about said conduit and member, said rotating member comprising an annularly arranged series of blades surrounding said discharge openings, means for delivering liquid or semi-liquid material to the inner sides of said blades whereby said member is rotated by the impact of said air by said blades and said material is finely divided and projected by said air and member.

4. A distributing head for a drying apparatus having in combination, a member having a series of circumferentially spaced blades arranged in an annulus, said blades extending at an angle to the radius of said annulus, a concave disk disposed above said blades and having its edge disposed adjacent the inner upper ends of said blades, means for directing liquid or semi-liquid material to said disk, and means disposed at the inner sides of said blades for directing air thereagainst to rotate said member to divide and project said material.

5. A wet collector having in combination, a cabinet, a conduit for delivering liquid to said cabinet, a rotating member to which said liquid is delivered, comprising a plurality of circumferentially spaced outwardly extending blades having spaces between their inner ends both in radial and circumferential directions and adapted to receive said liquid, and means for directing powder-carrying air through said spaces against said blades to rotate the same, whereby said liquid is divided and projected centrifugally by said member and air and said powder in said air is entrapped by said liquid.

6. A wet collector having in combination, a pipe for carrying liquid, a member rotating about said pipe having means below said pipe for receiving said liquid and having a plurality of circumferentially spaced blades arranged in an annulus to which said liquid is delivered, and a member within said annulus for delivering air outwardly to said blades to rotate said first mentioned member, whereby said liquid is sprayed centrifugally and any powder in said air will be entrapped in said liquid.

7. An apparatus for drying liquid or semi-liquid material having in combination, a stationary pipe for delivering compressed air, a head to which said pipe delivers having circumferentially spaced air delivery openings, a member comprising an annular sleeve, rotatable about said pipe, a plate carried by said member below said sleeve, a concave disk carried by said member surrounding said plate, a plurality of circumferentially spaced angularly disposed curved blades carried by said member and extending downwardly from said disk and surrounding said openings in said head, and a pipe extending downwardly in said sleeve, for delivering liquid to said plate whereby said liquid is delivered to said concave disk and blades and is disintegrated and projected by the combined action of said rotating member and air.

8. A distributing head for a drying apparatus having in combination, a rotating member having a plurality of circumferentially spaced outwardly extending portions adapted to be engaged by air to rotate said member, said member having a central opening surrounded by the inner ends of said portions, means for delivering liquid or semi-liquid material to said portions and means for delivering air to said member through said central opening and outwardly between said portions to rotate said member to assist in projecting and disintegrating said material and to dry said material.

9. A distributing head for a drying apparatus having in combination, a member rotatable about a substantially vertical axis and having a plurality of circumferentially spaced means adapted to be engaged by air to rotate said member, means for delivering liquid or semi-liquid material to said member and means, and means horizontally alined with said first mentioned means for directing air outwardly to the same to rotate said member for projecting and disintegrating said material and to assist in said projection and disintegration and to dry said material.

10. A distributing head for a drying apparatus having in combination, a member having a central opening and having a plurality of circumferentially spaced plates arranged about said opening and extending outwardly, means for delivering air through said opening to engage said plates and pass outwardly along the same to rotate said member and means for delivering liquid or semi-liquid material to said plates whereby said material is projected and finely divided by the joint action of said blades and air.

11. A wet collector having in combination, a cabinet, a pipe for delivering liquid to said cabinet having a discharge end, a rotating member to which said liquid is delivered comprising a plurality of circumferentially spaced plates arranged in an annulus and extending outwardly adapted to receive said liquid, means receiving said liquid from said pipe and delivering it to said member and means for directing powder-carrying air against said plates to rotate the same, said first mentioned means delivering said liquid to the central opening between said blades whereby said liquid is divided and projected centrifugally by said member and air and said powder in said air is entrapped by said liquid.

12. A wet collector having in combination, a pipe for carrying liquid having an open discharge end, a rotating member coaxial with said pipe having a plate adjacent said discharge end, a concave disk extending about said plate, a series of circumferentially spaced blades arranged in an annulus outwardly of said plate and to which said concave disk extends whereby liquid discharged by said plate engages said concave disk and is delivered to said blades, a head within said annulus having a plurality of air discharged means for discharging air against said blades to rotate said member and a conduit for delivering air to said head.

13. A spraying device for a wet collector having in combination, a support, a pipe carried by said support for supplying fluid and having an open discharge end, a rotating member surrounding said pipe and having a plate below said discharge end, a member surrounding said plate having an inner concave surface extending outwardly and downwardly and spaced from the edge of said plate, a series of circumferentially spaced annularly arranged blades below said last mentioned member and to which said concave surface extends, a head within and spaced from the inner ends of said blades having circumferentially spaced openings for discharging air against said blades to rotate said member and a conduit for supplying air to said head whereby said liquid is centrifugally discharged from said plate against said concave surface and delivered to said blades and is projected outwardly by said blades and the action of said air.

14. The structure set forth in claim 13, said conduit extending downwardly and being arranged coaxially with said rotating member.

15. A drying device having in combination, a chamber constructed and arranged to contain a heated gaseous drying medium, a rotatable member in said chamber for centrifugally projecting liquid or semi-liquid material having a central opening and including means for rotating said member by the force of air, means for delivering material to said member, means for simultaneously delivering air through said central opening to rotate said member and assist in projecting and finely dividing said material.

16. The method of disintegrating and drying liquid or semi-liquid material which consists in delivering said material without impact to a rotating member, centrifugally projecting said material outwardly from said member unobstructedly into a heated medium and further projecting, disintegrating and drying said material by simultaneously directing air outwardly in all directions from said member with said material.

JOHN C. MacLACHLAN.
JOHN M. MacLACHLAN.